US006530084B1

(12) United States Patent
Del Sesto et al.

(10) Patent No.: US 6,530,084 B1
(45) Date of Patent: Mar. 4, 2003

(54) AUTOMATED CONTROL OF INTERACTIVE APPLICATION EXECUTION USING DEFINED TIME PERIODS

(75) Inventors: Eric E. Del Sesto, Alameda, CA (US); Charlie McCullough, Saratoga, CA (US); Pat Ransil, Alameda, CA (US); Houman Azarm, Oakland, CA (US)

(73) Assignee: Wink Communications, Inc., Alameda, CA (US)

(*) Notice: Subject to any disclaimer, the term of this patent is extended or adjusted under 35 U.S.C. 154(b) by 0 days.

(21) Appl. No.: 09/431,001

(22) Filed: Nov. 1, 1999

(51) Int. Cl.[7] .......................... H04N 5/445; H04N 7/10; H04N 7/025; H04N 7/16; G06F 3/00; G06F 13/00

(52) U.S. Cl. ............................. 725/61; 725/60; 725/32; 725/136; 725/139; 725/141

(58) Field of Search ................................ 725/142, 134, 725/110, 116, 136; 709/217, 201, 245; 345/327; 455/5.1; 340/825.51; 380/231, 251; 463/29

(56) References Cited

U.S. PATENT DOCUMENTS

| 5,334,975 A | * | 8/1994 | Wachob et al. ........ 340/825.21 |
| 5,400,402 A | * | 3/1995 | Garfinkle .................... 380/231 |
| 5,448,568 A | * | 9/1995 | Delpuch et al. .......... 348/423.1 |
| 5,539,920 A | | 7/1996 | Menand et al. ............... 455/5.1 |
| 5,563,648 A | * | 10/1996 | Menand et al. ............. 725/142 |
| 5,585,858 A | | 12/1996 | Harper et al. ................. 348/485 |
| 5,652,615 A | | 7/1997 | Bryant et al. .................... 348/9 |
| 5,689,799 A | | 11/1997 | Dougherty et al. ............. 455/2 |
| 5,818,440 A | * | 10/1998 | Allibhoy et al. ............. 725/134 |
| 5,819,034 A | * | 10/1998 | Joseph et al. ................ 709/201 |

(List continued on next page.)

FOREIGN PATENT DOCUMENTS

EP         0-0942-595 A2  *  9/1999  ............ H04N/5/00

OTHER PUBLICATIONS

*Advanced Television Enhancement Forum Specification (ATVEF)*, Version 1.1r26, Feb. 2, 1999, pp. 1–37.

Pending U.S. patent application, "Automatic Control of Broadcast and Execution of Interactive Applications to Maintain Synchronous Operation with Broadcast Programs," Ser. No. 09/333,724, Filing date Jun. 15, 1999.

Pending U.S. patent application, "Automated Retirement of Interactive Applications Using Retirement Instructions for Events and Program States," Ser. No. 09/334,131 Filing date Jun. 15,1999.

Statement from first named inventor concerning Cited Reference G.

Wink Communications, Technical Specification, Subject: 5.2.17 ServerInfo Define, Dec. 31, 1995.

*Primary Examiner*—Andrew Faile
*Assistant Examiner*—Hai V. Tran
(74) *Attorney, Agent, or Firm*—Fenwick & West LLP

(57) ABSTRACT

A method and apparatus facilitate control of interactive application execution through use of defined time periods. A broadcaster transmits a broadcast program, an associated interactive application, and at least one definition of a time period from a set including: a first time period, during which an option to execute the application may be offered to a viewer; a second time period, during which execution of the application may be started; and a third time period, during which the application may be executed. A viewer tunes to a channel associated with the broadcast program and interactive application. A broadcast receiver offers the viewer the option to execute the interactive application, if within the first defined time period. If the user elects to so execute, the broadcast receiver starts said execution, if within the second defined time period. If the interactive application continues to execute at the end of the third defined time period, the broadcast receiver retires the interactive application.

35 Claims, 8 Drawing Sheets

U.S. PATENT DOCUMENTS

| | | | |
|---|---|---|---|
| 5,826,166 A | * 10/1998 | Brooks et al. | 345/327 |
| 5,848,352 A | * 12/1998 | Dougherty et al. | 725/110 |
| 5,850,447 A | * 12/1998 | Peyret | 463/29 |
| 5,861,881 A | 1/1999 | Freeman et al. | |
| 6,006,256 A | 12/1999 | Zdepski et al. | 709/217 |
| 6,018,768 A | 1/2000 | Ullman et al. | 709/218 |
| 6,021,433 A | 2/2000 | Payne et al. | |
| 6,061,719 A | 5/2000 | Bendinelli et al. | 709/218 |
| 6,064,438 A | 5/2000 | Miller | |
| 6,295,647 B1 | * 9/2001 | Ramaswamy | 725/116 |

* cited by examiner

AUTOMATED CONTROL OF INTERACTIVE APPLICATION EXECUTION USING DEFINED TIME PERIODS

BACKGROUND

1. Field of Invention

The present invention relates generally to systems and methods for controlling execution of interactive television applications and, more particularly, to systems and methods for determining appropriate time periods in which to offer, begin, and allow execution of such interactive applications.

2. Background of the Invention

Traditionally, the broadcast of television programs has been a one way transmission. A broadcaster would transmit a program which would be received and passively utilized by a viewer. More recently, interactive television has become both possible and popular. Utilizing the ample bandwidth of cable, interactive television applications may be transmitted along with the program material. These interactive applications, which are received and executed by a broadcast receiver, such as a set top decoder, are capable of requesting or otherwise gleaning data from the viewer, and delivering that data back to the broadcaster. Interactive applications have many potential uses, such as allowing a viewer to order a product that is associated with a specific program, conducting a poll, or gathering statistics on the program selection and watching habits of television viewers. Specific interactive applications that are associated with specific television programs greatly enhance the viewing experience, and enable new and useful marketing opportunities as well.

One problem with interactive television as it exists today is the lack of coordination of the offering, starting, and continuing of the execution of interactive applications with the broadcasting of television programs with which the applications are associated. It is often desirable to offer viewers an option to execute an interactive application associated with a specific television program. Such an offer is typically made by presenting an icon on the display, inviting the viewer to enter a control signal in order to execute the interactive application. However, television programs are of fixed lengths. Likewise, interactive applications typically require a minimum amount of time to completely execute. Once the amount of time remaining in a program is not sufficient for the offer and subsequent execution of an associated interactive application, it is no longer desirable for a broadcast receiver to offer the option to execute the interactive application to the viewer. This issue is compounded by the fact that viewers often change channels and tune in to television programs in progress. If a viewer tunes to a program which has an associated interactive television application, simply immediately offering the viewer an option to execute the program will be problematic if insufficient time remains in the program for the execution of the interactive application. For example, an interactive application that allows a viewer to order a product during a commercial may require a minimum of ten seconds to collect data from the viewer. If a viewer tunes in to the channel on which the commercial is being broadcast during the last six seconds of the commercial, there would not be enough time to execute the interactive application.

Offering and executing an interactive applications without sufficient running time in the corresponding broadcast program may result in the continued execution of the interactive application after the broadcast program has ended. This would confuse and frustrate the viewer, and perhaps prevent the execution of another interactive application that is associated with the new program which has begun. On the other hand, often a user will tune to a program in progress where ample time does remain to offer and execute the interactive application. In such a case, it is desirable to offer the application, and execute it if so instructed by the user. Similar issues are presented by starting and continuing execution of interactive applications associated with television broadcast programs in progress.

For example, suppose a viewer tunes to a documentary program concerning travel in Southeast Asia, for which there is an associated interactive application that allows the viewer to order a relevant travel guide. Assume only fifty seconds remains in the television program, and the minimum time needed to offer and execute the interactive application is three minutes. If the interactive application is offered to and selected by the viewer, the broadcast program will end prior to the completion of the execution of the interactive application. A new broadcast program will begin, for example a program concerning sports. The offer and execution of the travel guide interactive application is no longer appropriate for the broadcast program. If the interactive application continues to be offered to the viewer or is started or continues to execute with its associated travel broadcast program no longer present, there would be a mismatch between the interactive application and the broadcast program, typically leading to confusion or frustration on the part of the user. For example, if the viewer is watching the sports program, but the travel guide interactive application is still executing, the viewer will either be frustrated by the presence of the superfluous interactive application over a portion of the screen, or worse yet, order the travel guide mistakenly thinking that it is associated with the sports broadcast program.

SUMMARY OF THE INVENTION

The present invention solves the problem of coordinating the offering, starting, and executing of an interactive application with the broadcasting of the television program with which the application is associated. In the present invention, an interactive application includes definitions of time periods specifying when such operations are to be performed. hi the present invention, interactive applications are only offered to viewers, started, and executed during the defined time periods for which such activity is defined as appropriate.

The first defined time period specifies the earliest time at which the option to execute the interactive application may be offered to the viewer, and the latest time at which the option to execute may be so offered. The second defined time period specifies the earliest and latest times at which execution of the interactive may be started. The third defined time period specifies the earliest and latest times at which the interactive application is allowed to execute. Thus, the three time periods specify when an interactive application may be offered to a viewer, started, and executed. A time period is, in effect, a window during which an interactive application execution related activity is allowed to occur.

A system in accordance with the present invention includes a number of broadcast receivers, a broadcaster that is the source of broadcast data including television programs, commercials, and interactive applications, and a broadcast server which maintains a database of interactive applications. The various interactive applications are associated with individual broadcasters, television programs, and commercials. Each interactive application contains at least one definition of a time period concerning the offering, start, or execution as previously described.

A broadcast signal containing an interactive application and broadcast data is received by any broadcast receiver tuned to the specific channel upon which the interactive application is broadcast. The broadcast receiver decodes the broadcast signal. The broadcast receiver determines if the present time is within the defined period of time during which the interactive application may be offered to the viewer. The broadcast receiver only offers a viewer the option of executing the interactive application within that defined time period. If the viewer elects to execute, the broadcast receiver determines if the present time is within the defined period of time during which the execution of an interactive application may be started. Only within that defined time period will the broadcast receiver begun execution of the interactive application. If the interactive application is still executing at the end of the defined time period, during which the interactive application is permitted to execute, the broadcast receiver retires the interactive application.

DETAILED DESCRIPTION OF THE PREFERRED EMBODIMENTS

System Architecture

Figure 1:
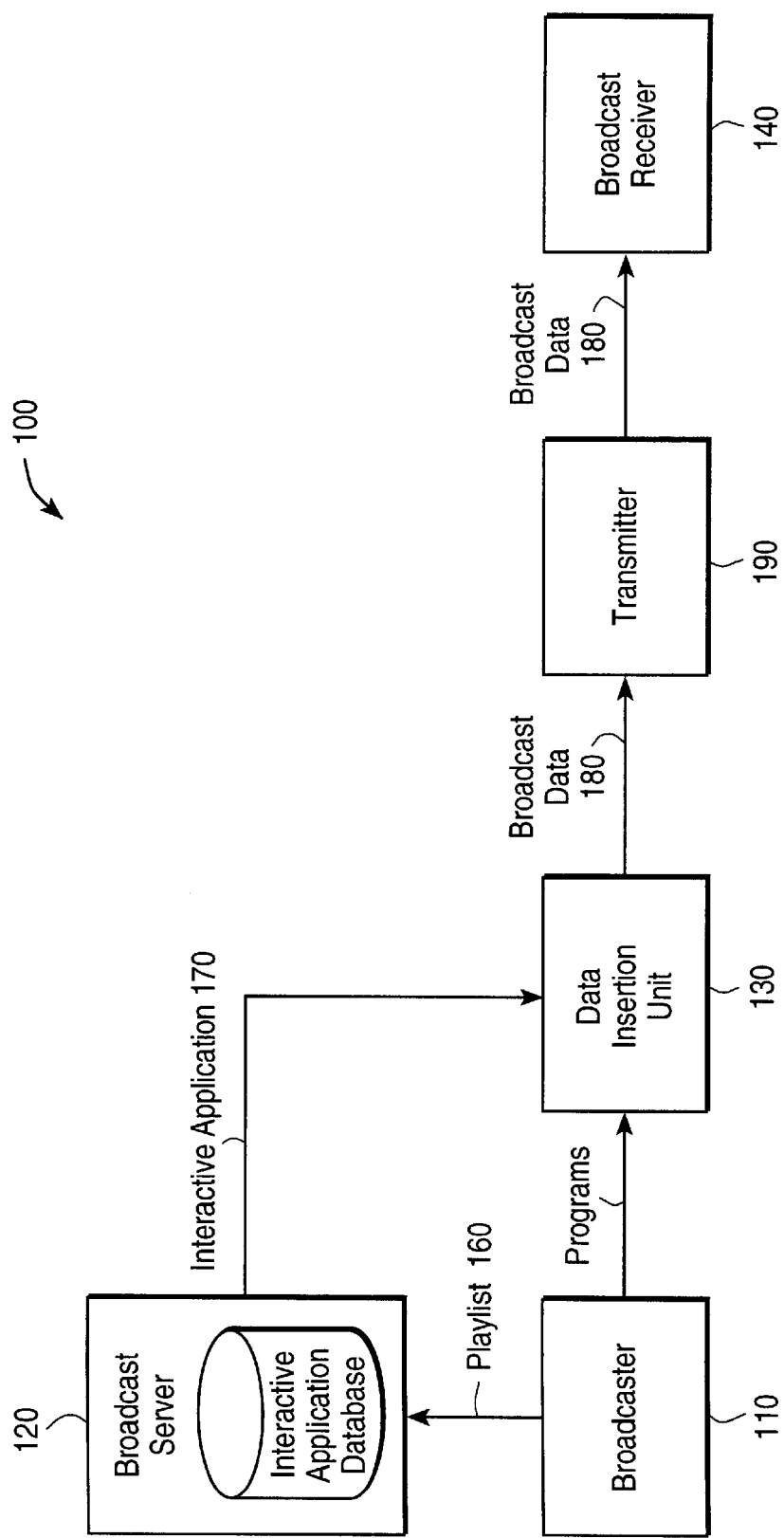
FIG. 1 is a high-level block diagram illustrating a system for performing retirement of interactive applications according to one preferred embodiment of the present invention.

FIG. 1 provides an illustration of the high level system architecture in accordance with the present invention. One skilled in the art will appreciate that the system illustrated in FIG. 1 may be incorporated into larger, more complex systems while still providing the features and benefits of the invention. Generally, system 100 includes a broadcaster 110, a broadcast server 120, a data insertion unit 130, and at least one broadcast receiver (BR) 140.

The broadcaster 110 provides program material to be broadcast to the BR's 140. As used herein, a "broadcaster" 110 is any entity providing a program that will be carried on a broadcast signal. A "program" is a discrete segment of a broadcast. Thus, as defined herein, program includes television shows, commercials, public service announcements, pay-per-view events, and the like. Broadcasters include television networks, as well as advertisers who prepare commercials, pay-per-view providers, cable networks, and the like. A typical broadcaster 110 maintains program sources, such as banks of video cassette players, video disc players, video servers, film, and the like containing program material; automation systems that selectively control the program sources to select which units provide program material at which times; and switching systems controlled by the automation systems which couple the program sources to respective broadcast media for controlling which program sources output to which broadcast media at any given time. In a preferred embodiment of the present invention, each broadcaster has a unique broadcaster identification code. The person or persons receiving the programs are referred to as "subscribers" or "viewers."

The broadcast server 120 is preferably a computer system executing a software program providing the functionality described herein. The broadcast server 120 contains an interactive application database 150 holding interactive applications that will be broadcast to various remotely distributed BR's 140. Interactive applications may be added to the interactive applications database 150 by a broadcaster 110 or other program supplier and may be transmitted to the database 150 by a secure network link or other transmission media. Fields within the database 150 associate interactive applications with, for example, a particular broadcaster, network, channel, program, and/or broadcast time. In addition, each interactive application in the database 150 preferably has a unique application identification code by which it may be identified. Also, each interactive application 170 preferably includes a definition of a first time period, during which an option to execute the application may be offered to a viewer, a definition of a second time period, during which execution of the application may be started, and a definition of a third time period, during which the application may be executed. These time periods may be stored in the interactive application 170 as bit fields containing offer values to be applied to a base reference value. The interactive application also preferably stores the base reference value as a bit field.

In one embodiment of the present invention, the interactive applications stored in the database 150 are described by a compact communications protocol. The compact protocol is designed to broadcast a compact set of information and commands among the system components in an efficient manner, thereby allowing the use of low bandwidth transports such as the vertical blanking interval (VBI). While a preferred embodiment of the present invention uses the compact protocol described therein, interactive applications may be described by other protocols, including for example, the Hypertext Markup Language ("HTML") or SUN MICROSYSTEMS INC.'s JAVA language. A detailed description of one compact protocol for interactive applications, including supported definitions, scripts, and commands, is described in U.S. Pat. No. 5,689,799, entitled "Method and Apparatus for Routing Confidential Information," which issued on Nov. 18, 1997 and is incorporated herein by reference.

The interactive applications are themselves software products comprising executable code and data, which configures and controls the operation of a broadcast receiver 140, as further described below. In a preferred embodiment of the present invention, an interactive application is represented as a series of data structures called records, in accordance with the compact communications protocol. In a preferred embodiment of the invention, the records of an application are placed into a single block for broadcast delivery. The block is a flexible packet structure consisting of a header, data portion, and footer. A block can contain one or more records. The header of a block preferably contains several transport-related fields which pertain equally to all of the records contained in the block. Specific examples of data contained in such fields are the application identification code for the application represented by those records, the broadcaster identification code for the broadcaster from which the program originated, the definitions of time periods described above, and a reference time base to which the defined time periods are relative.

There may be a plurality of broadcast servers 120, with each broadcast server 120 serving a particular geographic area, set of broadcasters, or set of subscribers. In a preferred embodiment, each broadcast server 120 is identified by a unique server identification code.

Generally, the broadcast server 120 determines which interactive applications should be broadcast on a particular channel at a particular time, retrieves the interactive applications corresponding to the particular channel and time from the database 150, and prepares the interactive applications for broadcast.

To determine which interactive applications are broadcast at the various times, channels, and so forth, the broadcast server 120 receives a playlist 160 of programs to be broadcast by the broadcaster 110. In one embodiment, this playlist 160 is prepared in advance and identifies the programs that will be broadcast by the broadcaster 110 at particular times. In another embodiment, the broadcast server 120 receives the playlist 160 in real-time, identifying the program currently being broadcast by the broadcaster 110, with the playlist 160 being updated as the broadcast changes. In either embodiment, the playlist 160 contains sufficient information to identify each program, its start and end times, the channel and network assignments, or broadcaster identification code. The broadcast server 120 uses this information to identify and retrieve a corresponding interactive application from the database 150 that is to accompany the program.

The broadcast server 120 formats a retrieved interactive application, if necessary, and otherwise prepares it for insertion into a broadcast signal. Using the playlist 160 received from the broadcaster 110, the broadcast server 120 passes the interactive application 170 to the data insertion unit ("DIU") 130 to incorporate the interactive application 170 into the broadcast feed concurrent with the broadcast of the program.

The DIU 130 receives the interactive application 170 from the broadcast server 110 and the broadcast signal, or feed, carrying the program corresponding to the interactive application 170. The broadcast feed may be received from the broadcaster 110, or, in the case where the broadcaster does not provide the feed, from a third party such as a network, cable operator, or local television station. The DIU 130 converts the interactive application 170 into a format suitable for insertion into the broadcaster feed and transmission therewith as broadcast data 180. The DIU 130 may receive feeds from multiple broadcasters and can insert a separate interactive application into each feed. Likewise, the DIU 130 can simultaneously insert a separate interactive application into multiple channels from the same, or different, broadcasters 110.

The DIU 130 inserts the broadcast data 180 containing the interactive applications and broadcast programs into the broadcast medium. The broadcast medium is the frequency spectrum used to carry the interactive application 170. In one embodiment, the broadcast medium is a standard analog television signal following National Television Standards Committee ("NTSC") standards and the VBI is used as a transport to broadcast the interactive application 170. The transport is the specific portion of the broadcast medium which carries the interactive application 170. In another embodiment, the broadcast medium is a standard MPEG2 Digital Video Multiplex containing one or more MPEG2 Video Services, and an MPEG2 elementary stream (or streams) within this multiplex is used as a transport.

In one embodiment, the DIU 130 uses conventional methods to insert data defining an interactive application into the VBI of the broadcast feed. The North American Broadcast Teletext Standard (EIA-506), defines the methods and protocols for sending data in one or more lines of the VBI. However, a wide variety of other transport mechanisms are available, including those that broadcast the interactive application 170 separately from the television program. Such transport mechanisms include out-of-band transmitters, which transmit the interactive application 170 on an unused portion of the television frequency spectrum, and conventional frequency modulation ("FM") radio transmitters, which transmit the interactive application 170 outside the television frequency spectrum. In another embodiment, the DIU 130 uses conventional methods to insert data into an elementary stream within an MPEG2 multiplex. The DIU 130 may operate as an interface to a wide area network that connects the broadcaster 110 or broadcast sources 102 directly to various transmitters 190. In one embodiment, error checking or error correcting codes such as Hamming codes are inserted with the broadcast data. In one embodiment, the DIU 130 translates the data into a Hamming code, and in another embodiment, the data received by the DIU 130 from the broadcast server X140 is already encoded.

The DIU 130 is coupled to a transmitter 190 for transmitting the broadcast data 180, including the inserted interactive application. In one embodiment, the transmitter 190 is a satellite uplink transmitting the data 180 to local satellite receivers which then distribute the data 180 to the BR's 140 via cable. In another embodiment, the transmitter 190 is a conventional cable system head-end amplifier. In yet other embodiments, the transmitter 190 is a conventional television broadcast transmitter or a high-definition digital television transmitter.

In another embodiment, the DIU 130 inserts the interactive application 170 into the program before the program is broadcast. For example, the DIU 130 may insert an interactive application into the source copy of a television commercial. Accordingly, the interactive application is broadcast whenever the commercial is broadcast. In this embodiment, the broadcast server 120 does not need to synchronize the retrieval of the interactive application with the schedule listed in the playlist.

Broadcast Receiver

Regardless of transmission method and insertion time, the broadcast data 180 is received by a subscriber's BR 140. Although only a single BR 140 is illustrated in FIG. 1, it is understood that in a typical embodiment there are hundreds or thousands of BR's 140 receiving the broadcast data 180 and responding as described herein. In a typical embodiment, the BR 140 is a television set-top box receiving the data via a coaxial cable.

Alternatively, the BR 140 may be integrated into the television. Moreover, other broadcast receivers, including a NTSC broadcast receiver, a high-definition television digital receiver, a video cassette recorder, or an FM radio receiver can also be used.

Figure 2:
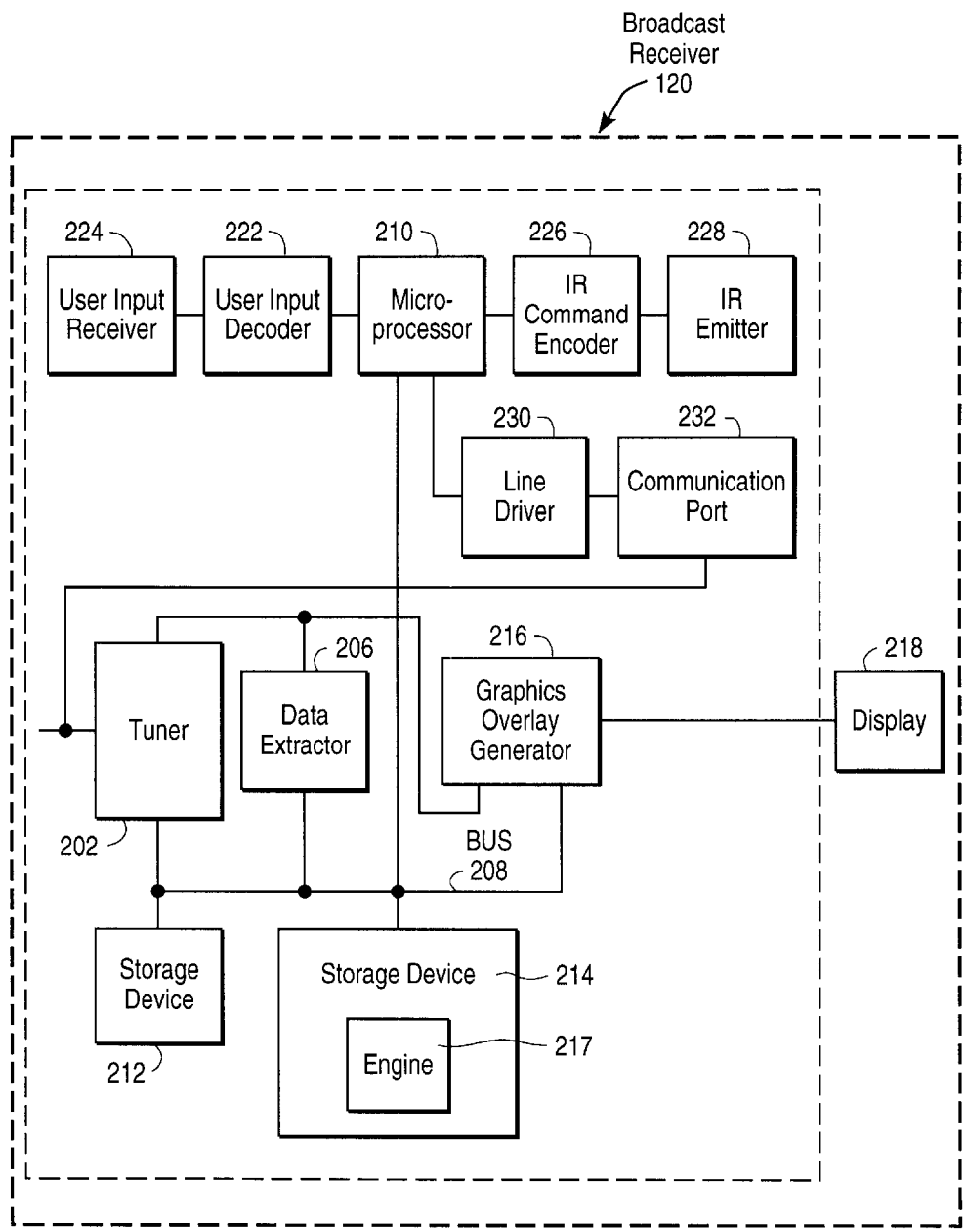
FIG. 2 is a block diagram illustrating an embodiment of a broadcast receiver.

FIG. 2 illustrates an embodiment of the BR 140 according to an embodiment of the present invention. In one embodiment, the BR 140 is the General Instrument CFT-2200 CATV set-top decoder. The BR 140 includes a tuner 202 for receiving the broadcast data 180 from the transmitter 190. In one embodiment, the tuner 202 is a conventional cable television tuner. In other embodiments, the tuner is a television broadcast tuner, a FM radio tuner, a digital tuner, or some other form of tuner. In one embodiment, a personal computer with the appropriate hardware and software may function to receive and display broadcast programs over various types of transmission channels, including cable, the Internet, and satellite. The embodiment illustrated in FIG. 2 shows a display 218, typically a television, within the BR 140. As mentioned above, the display 218 may also be located external to the BR 140.

The BR 140 also includes a data extractor 206 coupled to the tuner 202 for extracting the interactive application from the broadcast data 180. In one embodiment, the data extractor 206 is a conventional VBI inband data extraction circuit. In another embodiment, the data extractor 206 is a conventional modem. The data extractor 206 provides a serial bitstream containing the extracted interactive application onto a bus 208. The bus 208 is coupled to a microprocessor 210 which stores, via the bus 208, the extracted interactive application into a first storage device 212 as instructed by a program stored in a second storage device 214. In one embodiment, the microprocessor 210 uses the error code information from the extracted data to check or correct errors in the decoded interactive application. In one embodiment, the first storage device 212 is a conventional random access memory ("RAM") while the second storage device 214 is a conventional read-only memory ("ROM"). Other memory types, such as a flash memory which is readable and writeable yet retains its contents after a power loss, may be substituted for the second storage device 214. An advantage of flash memory is that software or data resident in the BR 140 can be modified by a received interactive application.

In one embodiment, the BR 140 also uses the data extractor 206 to extract a time signal from the broadcast data 180. The time signal indicates the current time using a standard time base, such as Coordinated Universal Time ("UTC") or the subscriber's local time. In another embodiment, the BR 140 has a real-time clock that is either set by the subscriber or the received time signal. Regardless, the BR 140 preferably has access to the current time and, accordingly, can perform date stamping and timing functions.

As described below, the microprocessor 210 uses the program stored in the second storage device 214 and the interactive application stored in the first storage device 212 to execute the interactive application. The program stored in the second storage device 214 is preferably an execution engine 217 for executing an interactive application defined by various scripts, forms, definitions, and code and graphic resources. A preferred execution engine is the Wink Engine provided by Wink Communications, Inc. of Alameda, Calif.

The output from executing an interactive application may be, for example, a form presenting information or a menu to a television viewer or for receiving viewer input, or it may be a response, silent or otherwise, containing BR 140 or television usage data or indicating viewer preferences. To this end, the BR 140 preferably includes a graphics overlay generator 216 coupled to the bus 208 and driven by the interactive application 170 stored in the first storage device 212 and the program stored in the second storage device 214. The graphics overlay generator 216 generates a graphical display responsive to the interactive application 170. This graphical display is displayed on a display 218, typically a television, coupled to the BR 140. Of course, the graphics overlay generator 216 is typically not used when an interactive application silently executes.

In one embodiment, the graphics overlay generator 216 also receives the broadcast signal corresponding to a broadcast program from the tuner 202 to allow simultaneous display of the broadcast program and the graphical aspects, if any, of the interactive application 170, for example, to input data into a displayed form. In one embodiment, the microprocessor 210 is also coupled to a user input decoder 222 coupled to a user input receiver 224 to allow the user to communicate with the microprocessor 210 in order to respond to the interactive application 170. In one embodiment, the user input decoder 222 is a conventional infrared remote control decoder. The user input receiver 224 is preferably a conventional infrared receiver 224 with which the user may use a conventional hand held remote control device. Remote control keys pressed by the user translate to coded infrared signals that are received by the user input receiver 224, are decoded by the user input decoder 222, and sent to the microprocessor 210 to allow the user to communicate with the interactive application 170. The microprocessor 210 may also be coupled to a conventional infrared command encoder 226, which accepts an infrared command input and encodes a signal for a conventional infrared emitter 228 to allow the interactive application 170 to control external devices.

Broadcast Receiver Decoding of an Application

Figure 3:
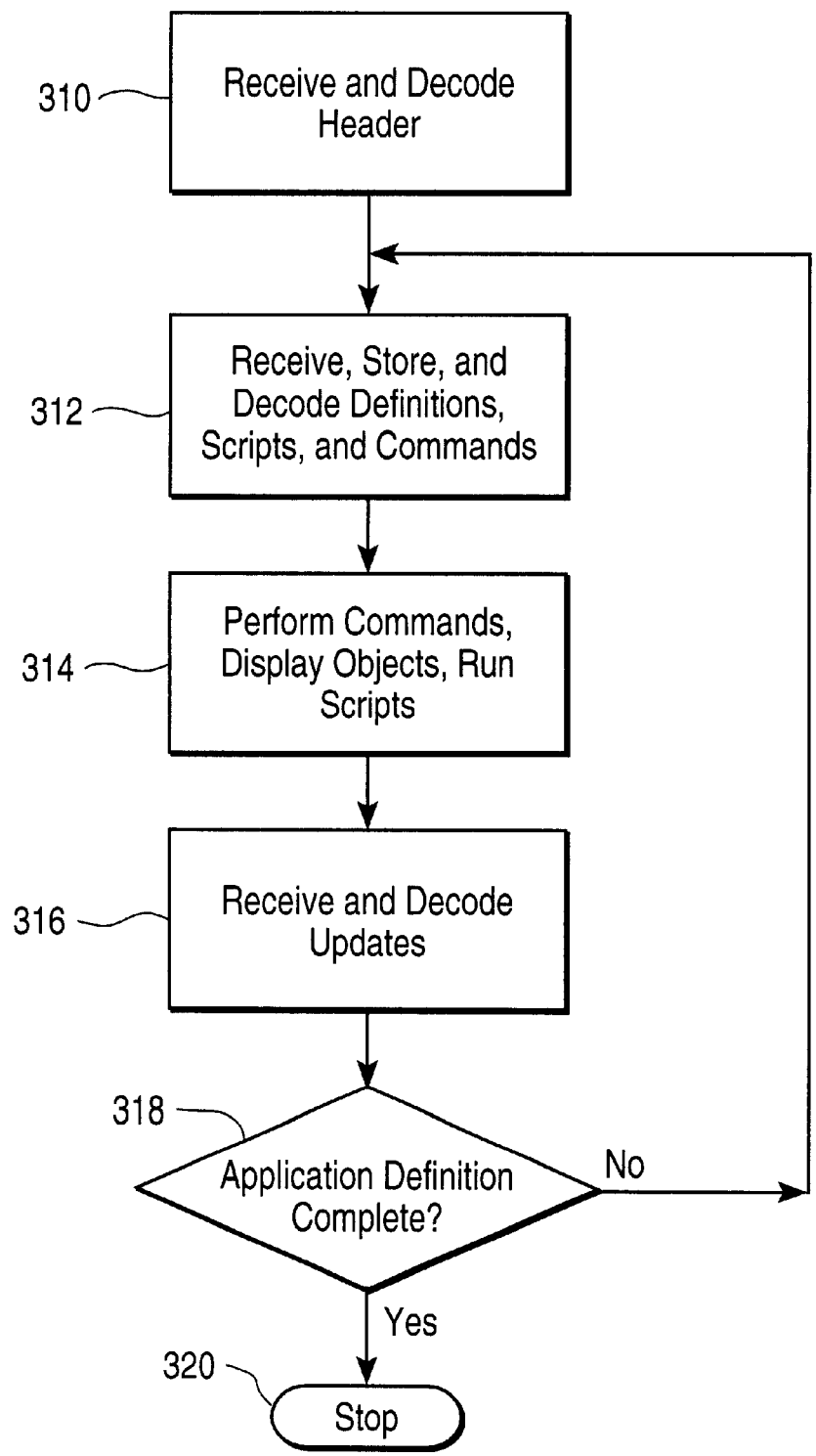
FIG. 3 is a flow chart illustrating steps for receiving and operating an interactive application by a broadcast receiver.

FIG. 3 is a flow chart illustrating steps for receiving and operating an interactive application 170 using the compact information protocol according to a preferred embodiment of the present invention. The BR 140 receives and decodes 310 an application header record prepared by the broadcast server 120, inserted by the DIU 130, and transmitted by the transmitter 190. The application header record describes the information that follows and preferably includes a definition of a first time period, during which an option to execute the application may be offered to a viewer, a definition of a second time period, during which execution of the application may be started, a definition of a third time period, during which the application may be executed, a reference time base to which the definitions are relative, and other application information as desired.

The BR 140 receives and decodes the definitions, commands, and scripts that comprise the interactive application 170. The BR 140 executes 314 the interactive application 170 as appropriate according to the defined time periods. Some or all of the received interactive application 170 may be stored 312 within the BR 140. If there are additional or updated definitions, commands, or scripts they may be sent until the application is complete 318. Updates to the interactive application 170 are received and decoded 316 by the BR 140. In a preferred embodiment of the present invention, the block containing the interactive application is repeatedly and continuously transmitted and received during the time period in which the interactive application is to execute.

Control of Interactive Applications through Use of Time Periods

Figure 4:
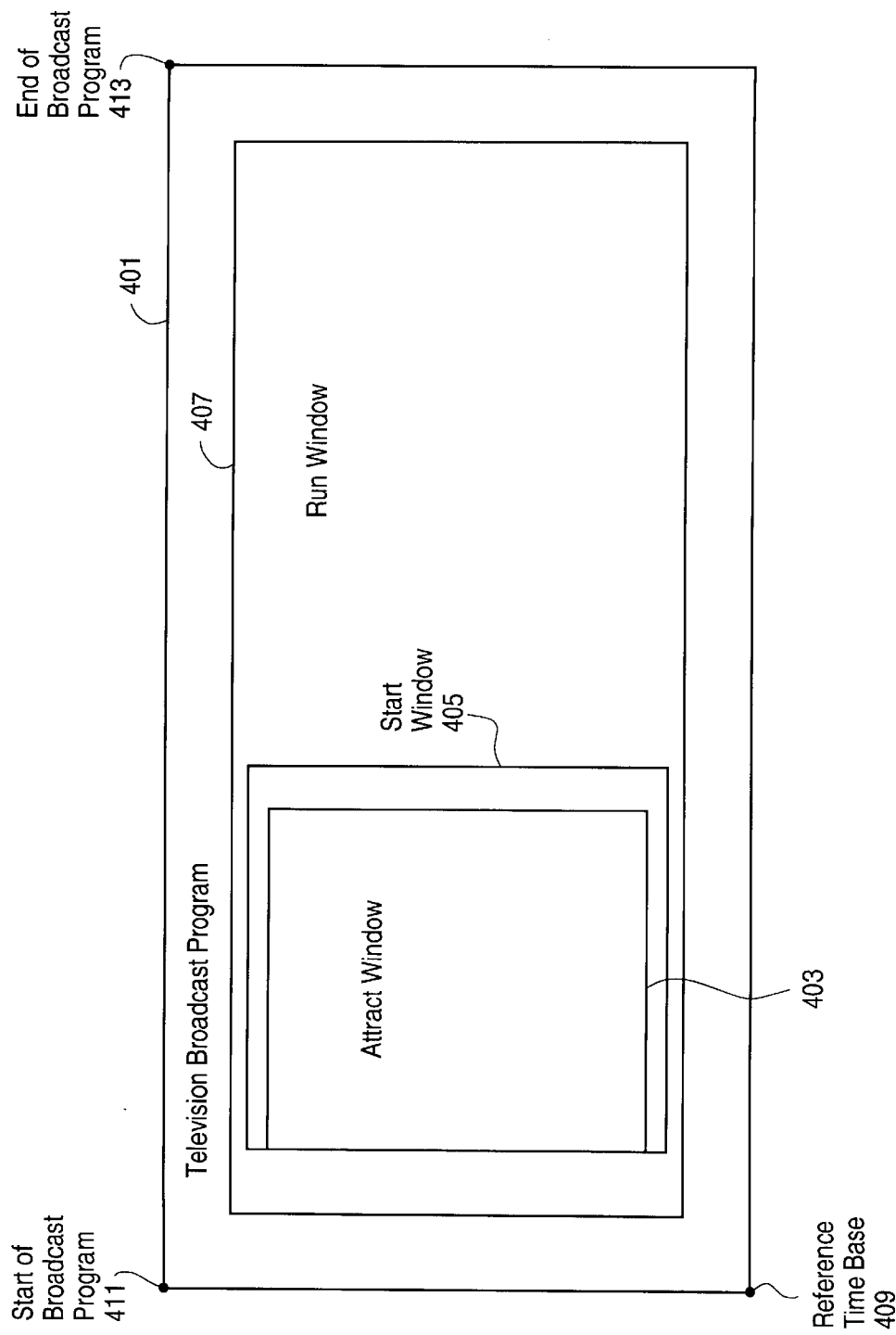
FIG. 4 illustrates defined time periods in an interactive application.

FIG. 4 illustrates the defined periods of time for controlling the execution of an interactive application 170 in a preferred embodiment of the present invention. The time periods are defined relative to and within a period of time 401 during which the associated television program is broadcast. Preferably, each interactive application 170 includes a definition of a first time period, called an attract window 403, during which the BR 140 may offer an option to execute the interactive application 170 to a viewer, a second time period, called a start window 405, during which the BR 140 may begin execution of the application, and a third time period, called a run window 407, during which the interactive application 170 may be executed by the BR 140.

Preferably, each interactive application 170 also includes a reference time base 409 to which the defined periods of time are relative. The reference time base 409 preferably corresponds to the start time 411 of the broadcast program 401 with which the interactive application 170 is associated. It is necessary to include in an interactive application 170 a frame of reference relative to the start time 411 of the broadcast program 401 because a viewer may tune to the program 401 after it has begun. For example, if a viewer tunes to a television program 401 with an associated interactive application 170 ten minutes after the program 401 has started, absent a time base 409 referring to the start time 411 of the television program 401, the BR 140 would be unable to determine when the program 401 began, and whether enough time remains to offer, start, or execute the interactive application 170. The reference time base 409 allows the BR 140 to determine the amount of time that has transpired since the beginning 411 of the broadcast program 401, and thus provides a meaningful frame of reference for the attract window 403, the start window 405, and the run window 407, all of which are defined relative to the start of the broadcast program 401. In alternative embodiments, the reference time base 409 corresponds to times in the broadcast program 401 other than the start time 411, for example a time ten seconds after the start 411.

Figure 5:
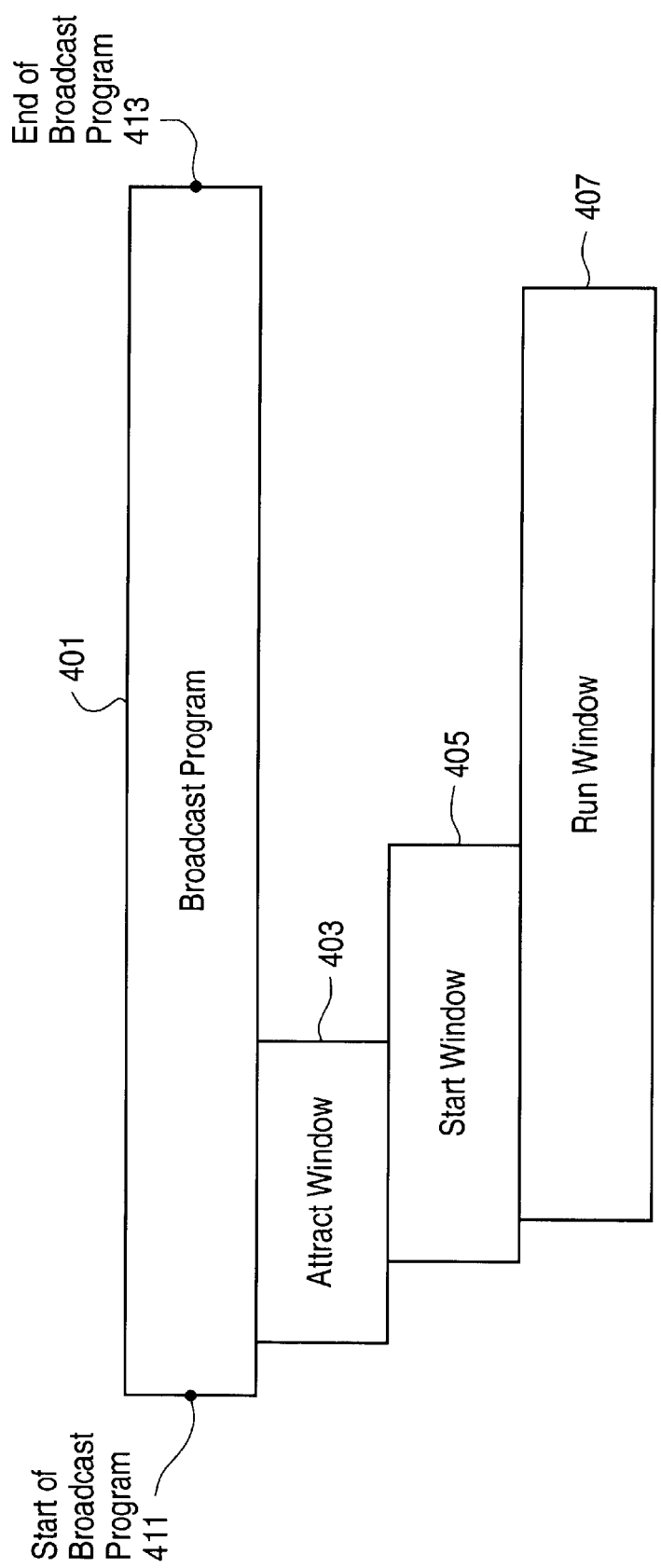
FIG. 5 illustrates the relationship between defined time periods and an associated broadcast program.

FIG. 5 illustrates the relationship between the defined time periods and an associated broadcast program 401. The attract window 403 extends from the earliest possible time at which the BR 140 may offer an option to execute the interactive application 170 to a viewer, to the time by which the BR 140 must cease to so offer the interactive application 170. The option to execute the interactive application 170 must be offered to the viewer early enough in the broadcast of the associated television program 401 so that the interactive application 170 can be executed completely before the television program 401 ends. Therefore, as illustrated in FIG. 5, the attract window 403 preferably begins after the beginning 411 of the broadcast program 401, and ends prior to the end 413 thereof.

Preferably, the BR 140 offers the option to execute an interactive application 170 to a viewer by displaying a graphical image on the television screen, instructing the viewer to enter a control signal to execute the application 170. Alternatively, the BR 140 offers such an option to a viewer through the use of a displayed text message, generation of sounds, or other communicative output mechanisms as desired.

The start window 405 extends from the earliest possible time at which the BR 140 may start execution of the interactive application 170, to the latest time at which the BR 140 may so start the execution. The BR 140 must start the execution of the interactive application 170 after the viewer has elected to start the application 170, and early enough in the broadcast of the associated television program 401 so that the interactive application 170 can be executed completely before the end 413 of the television program 401. Therefore, as illustrated in FIG. 5, the start window 405 preferably begins after the beginning of the attract window 403, and ends prior to the end 413 of the television broadcast program 401.

The run window 407 extends from the earliest possible time at which the execution of the interactive application 170 may begin, to the time by which the interactive application 170 must cease to execute. The interactive application 170 must completely execute during the broadcast of the associated television program 401. The interactive application 170 may not continue running after the associated broadcast program 401 has ended. Therefore, the run window 407 preferably does not exceed the length of the broadcast program 401. Where the interactive application 170 is still executing at the end of the run window 407, the BR 140 will retire the interactive application 170. In the example illustrated in FIG. 5, the run window 407 ends before the television program 401. It is to be understood, however, that in alternative embodiments the run window 407 can be equal in length to the television program 401, or may extend beyond the television program 401.

The mechanisms for retiring 539 interactive applications 170 are described in detail in U.S. patent application Ser. No. 09/334,131, entitled "Automated Retirement of Interactive Applications Using Retirement Instructions For Events and Program States," which was filed on Jun. 15, 1999, and is incorporated herein by reference.

Preferably, all of the beginning and ending times of these windows are relative to the reference time base 409, and therefore preferably to the start 411 of the associated broadcast program 401. In a preferred embodiment, upon receipt of the windows and reference time base 409, the BR 140 initializes an internal timer and begins keeping track of the passage of time relative to the reference time base 409. Where the viewer turns into a broadcast program 401 in progress, the internal timer is set so as to account for the time elapsed since the start 411 of the broadcast program 401. In alternative embodiments of the present invention, the times are relative to a Broadcaster 110 provided interactive application 170 start time, to an independent timer internal to the BR 140, or to other time reference points as desired.

The defined attract window 403, start window 405, run window 407, and the reference time base 409 are preferably included in the first record of the interactive application 170. In alternative embodiments, only the attract window 403, only the start window 405, only the run window 407, or only a combination of any two of the windows is included in the interactive application 170. In another alternative embodiment, the reference time base 409 is not included in the interactive application 170, and all time periods are alternatively referenced as described above. In alternative embodiments, the defined time periods and the reference time base 409 are not included in the first record, but instead are included in a later record of the interactive application 170. In another alternative embodiment, the defined time periods and the reference time base 409 are not included in the interactive application 170, but instead are transmitted separately.

Figure 6:
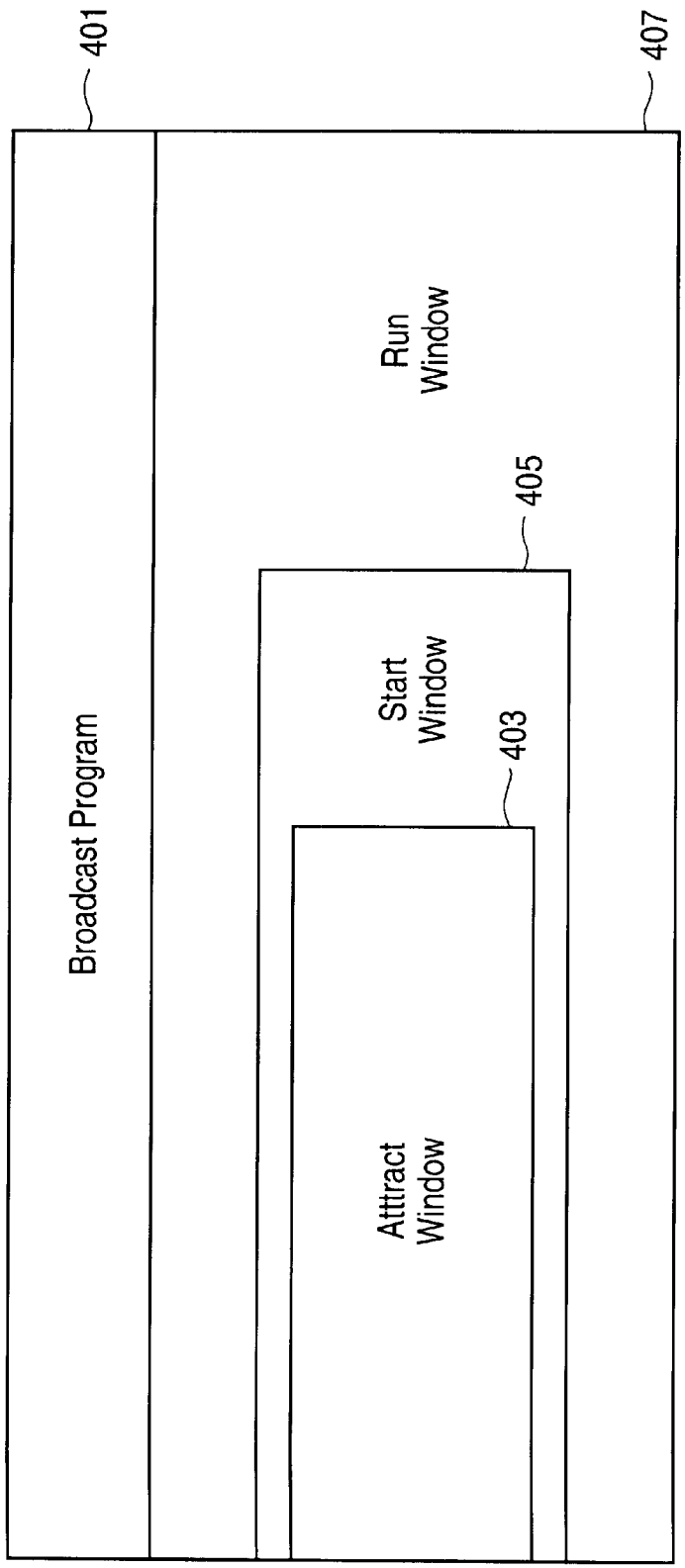
FIG. 6 illustrates the relationship between the various defined time periods in one preferred embodiment of the present invention.
Figure 7:
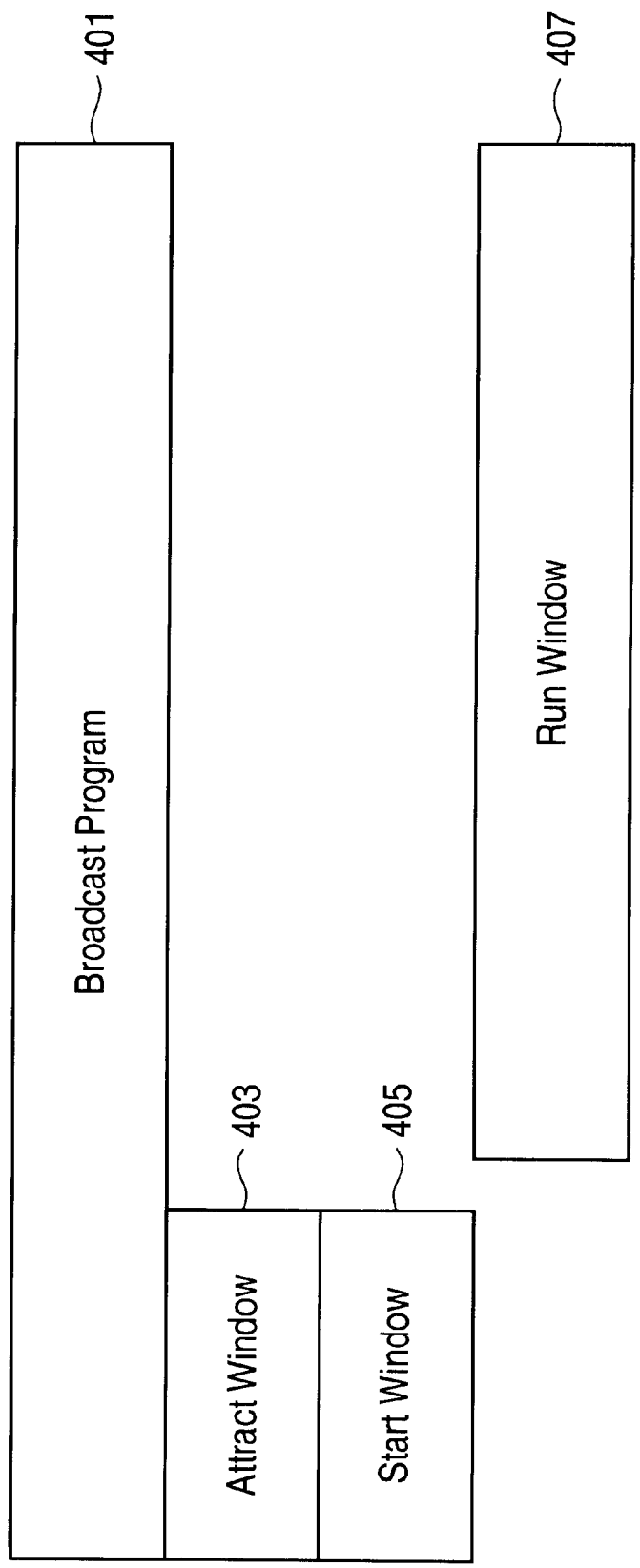
FIG. 7 illustrates the relationship between the various defined time periods in an alternative embodiment of the present invention.

In a preferred embodiment, the attract window 403 is a subset of the start window 405, as illustrated in FIG. 6. In an alternative embodiment, this is not the case, as exemplified in FIG. 7, in which the attract window 403 and the start window 405 comprise the same period of time. Preferably, the start window 405 is a subset of the run window 407, as illustrated in FIG. 6. Alternatively, this is not so. FIG. 7 illustrates an alternative embodiment in which the run window 407 does not begin until after the start window 405 ends, allowing for a delay to accommodate a lengthy start procedure.

Upon receiving the interactive application 170 and time periods, the BR 140 determines if a present time is within the attract window 403. The BR 140 will not offer the viewer the option to execute the interactive application 170 until the attract window 403 has begun. If the attract window 403 ends and the viewer has not yet utilized the option to execute the application 170, the BR 140 will cease to offer the option. Where the viewer utilizes the option to execute the application 170, the BR 140 determines if a present time is within the start window 405. The BR 140 will not start the execution of the interactive application 170 until the start window 405 has begun. Once the start window 405 has ended, the BR 140 will not start the interactive application 170. Next, the BR 140 determines if a present time is within the run window 407. The BR 140 will not allow the interactive application 170 to execute until the run window 407 has begun. If the run window 407 expires but the interactive application 170 is still executing, the BR 140 will retire the interactive application 170.

The reference time base 409 may be retransmitted by the broadcaster 110, in which case the BR 140 will reinitialize or reset its internal timer relative to the new reference time base 409. Any of the window definitions may be retransmitted by the broadcaster 110, in which case the BR 140 will update the window definitions with the received superseding window definitions, and respond accordingly.

Figure 8:
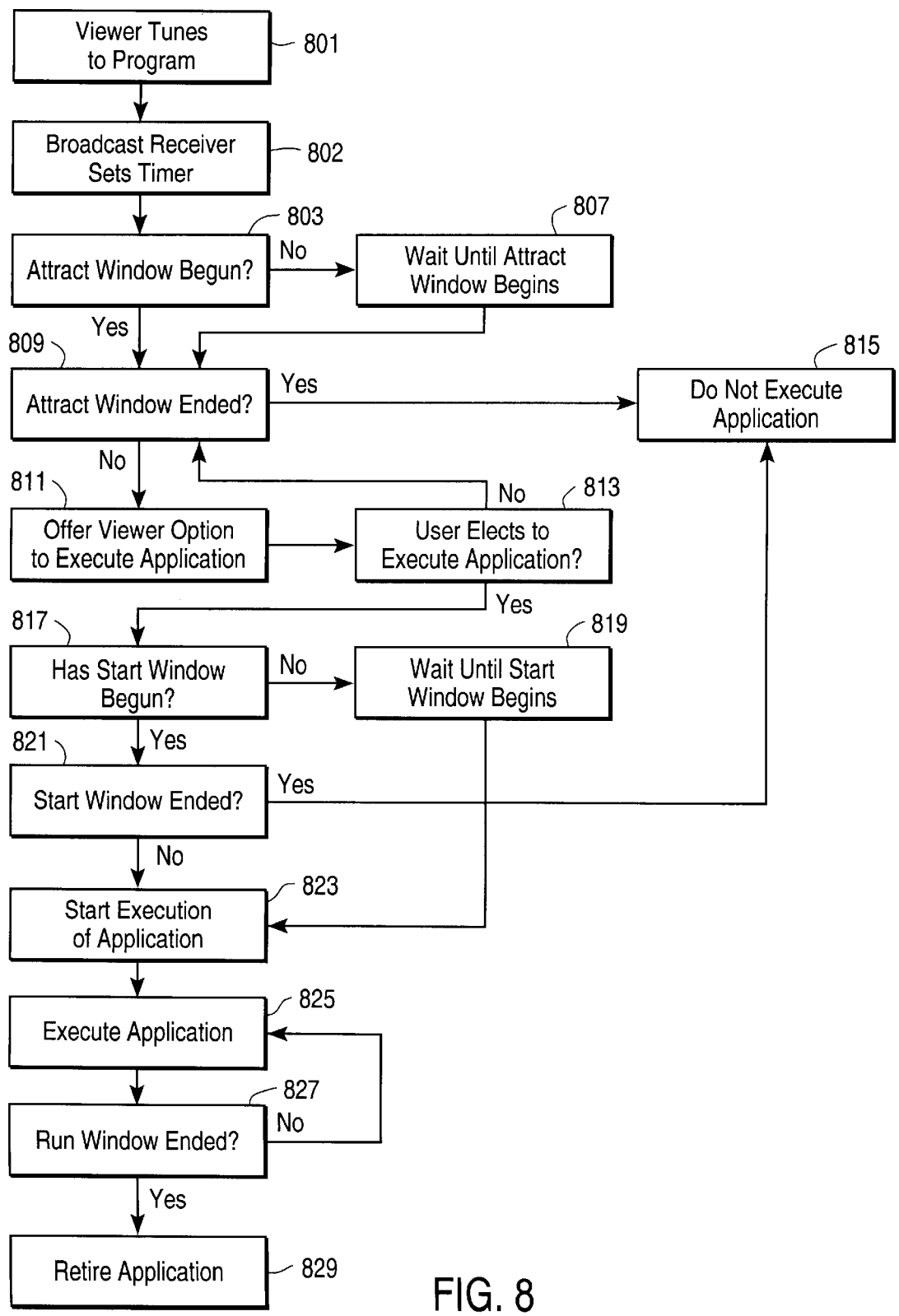
FIG. 8 is a flow chart illustrating the process of control of interactive application execution based upon defined time periods.

FIG. 8 is a flow chart illustrating the process of time period control of interactive application 170 execution in a preferred embodiment of the present invention. A viewer tunes 801 to a program 401 with which an interactive television application is associated. The BR 140 sets 802 its internal timer based upon the reference time base 409. The BR 140 determines if the attract window 403 has begun 803. If the attract window 403 has not yet begun 803, the BR 140 waits 807 until it has before proceeding. If the attract window 403 has begun 803, the BR determines if the attract window 403 has ended 809.

If the attract window 403 has not ended 809, the BR 140 proceeds to offer 811 to the viewer the option to execute the interactive application 170. As long as the viewer does not elect 813 to execute the interactive application 170 and the attract window 403 has not ended 809, the BR 140 offers 811 the viewer the option to execute the interactive application 170. Once the BR 140 determines that the attract window 403 has ended 809, the BR 140 no longer offers 811 the viewer the option to execute the interactive application 170, and does not execute 815 the interactive application 170.

If the viewer elects 813 to execute the interactive application 170, the BR 140 determines if the start window 405 has begun 817. If the start window 405 has not yet begun 817, the BR 140 waits 819 it until it has before proceeding. If the start window 405 has begun 817, the BR 140 proceeds to determine whether the start window 405 has ended 821.

If the start window 405 has not ended 821, the BR 140 proceeds to start 823 the execution of the interactive application 170. If the start window 405 has ended 821, the BR 140 does not start 823 the execution of the interactive application 170.

Once the interactive application is executing 825, the BR 140 determines if the run window 407 has ended 827. So long as the run window 407 has not ended 827, the BR 140 allows the interactive application 170 to continue to execute 825. Once the run window 407 has ended 827, the BR 140 retires 829 the interactive application 170.

It is to be understood that the process of time period control of interactive application 170 execution as illustrated in FIG. 8 is effective where a viewer tunes to a program 401 in progress, either by changing to a channel during the broadcast of a television program 401, or by turning on a television during the broadcast of a program 401. Of course, the process is also effective where a viewer watches an entire broadcast program 401 from beginning 411 to end 413.

We claim:

1. A method in a computer system for controlling execution of interactive applications by a broadcast receiver, the method comprising:

tuning, by the broadcast receiver, to a channel on which a broadcast program is being transmitted;

receiving by the broadcast receiver an interactive application associated with the broadcast program, a first defined time period, during which an option to execute the application may be offered to a viewer, a second defined time period, during which execution of the application may be started, and a third defined time period, during which the application may be executed, wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null; and controlling execution timing of the interactive application by the broadcast receiver according to the defined time periods.

2. The method of claim 1, the method further comprising:

offering to the viewer, by the broadcast receiver, the option to execute the interactive application during at least some of the first time period, during which the option to execute the application may be offered.

3. The method of claim 1, the method further comprising:

waiting by the broadcast receiver until the first time period, during which the option to execute the interactive application may be offered, has at least started prior to offering the option to execute the interactive application to the viewer.

4. The method of claim 1 the method further comprising:

determining by the broadcast receiver that a present time is within the first time period, during which an option to execute the interactive application may be offered to a viewer; and offering to the viewer, by the broadcast receiver, the option to execute the interactive application.

5. The method of claim 1, the method further comprising:

starting execution of the interactive application by the broadcast receiver in response to a control signal from the viewer during the second time period, during which the execution of the interactive application may be started.

6. The method of claim 1, the method further comprising:

waiting until the second time period, during which execution of the interactive application may be started, has at least begun prior to executing the interactive application.

7. The method of claim 1 the method further comprising:

determining by the broadcast receiver that a present time is within the second time period, during which execution of the interactive application may be started; and starting execution of the interactive application by the broadcast receiver in response to a control signal from the viewer.

8. The method of claim 1, the method further comprising:

executing the interactive application by the broadcast receiver during at least some of the third time period, during which the interactive application may be executed.

9. The method of claim 1, the method further comprising:

detecting by the broadcast receiver the expiration of the third time period, during which the interactive application may be executed; and retiring the interactive application by the broadcast receiver.

10. The method of claim 1, the method further comprising:

receiving by the broadcast receiver a reference time base to which at least one received defined time period is relative;

maintaining an internal timer by the broadcast receiver relative to the reference time base; and determining by the broadcast receiver occurrences of at least one beginning and at least one ending of at least one received defined time period relative to the internal timer.

11. The method of claim 10, the method further comprising:

receiving by the broadcast receiver, after receipt of an initial reference time base, a new reference time base associated with the interactive application;

maintaining an internal timer by the broadcast receiver relative to the new reference time base; and determining by the broadcast receiver occurrences of at least one beginning and at least one ending of at least one received defined time period relative to the internal timer.

12. The method of claim 1, the method further comprising:

receiving by the broadcast receiver, after receipt of the defined time periods, at least one updated defined time period; and replacing an associated earlier defined time period with the updated defined time period.

13. A method in a computer system for offering to a viewer, by a broadcast receiver, an option to execute an interactive application associated with a broadcast program, the method comprising:

tuning, by the broadcast receiver, to a channel on which a broadcast program is being transmitted;

receiving by the broadcast receiver, an interactive application associated with the broadcast program a first defined time period, during which an option to execute the application may be offered to a viewer, a second defined time period, during which execution of the application may be started, and a third defined time period, during which the application may be executed, wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null;

determining by the broadcast receiver whether a present time is within the first defined time period, during which the interactive application may be offered to a viewer;

in response to the present time being within the first defined time period, offering to the viewer, by the broadcast receiver, an option to execute the interactive application; and in response to the present time not being within the first defined time period, not offering the viewer an option to execute the interactive application.

14. The method of claim 13 further comprising:

receiving a reference time base by the broadcast receiver; and making the determination by the broadcast receiver of whether a present time is within the first received time period during which the interactive application may be offered to a viewer based upon the reference time base.

15. A method in a computer system for starting, by a broadcast receiver, execution of interactive applications associated with broadcast programs, the method comprising:

tuning by the broadcast receiver, to a channel on which a broadcast program is being transmitted;

receiving by the broadcast receiver, an interactive application associated with the broadcast program a first defined time period, during which an option to execute the application may be offered to a viewer, a second defined time period, during which execution of the application may be started, and a third defined time period, during which the application may be executed, wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null;

determining by the broadcast receiver whether a present time is within the second defined time period, during which execution of the interactive application may be started;

in response to the present time being within the second defined time period, starting the execution of the interactive application by the broadcast receiver; and in response to the present time not being within the second defined time period, not starting the execution of the interactive application by the broadcast receiver.

16. The method of claim 15 further comprising:

receiving a reference time base by the broadcast receiver; and making the determination by the broadcast receiver of whether a present time is within the second received time period during which execution of the interactive application may be started based upon the reference time base.

17. A broadcast receiver for controlling execution of interactive applications, the broadcast receiver comprising:

a tuner for receiving a broadcast signal including broadcast programs and interactive applications;

a computer memory storing an interactive application associated with a broadcast program, a first defined time period, during which an option to execute the application may be offered to a viewer, a second defined time period, during which execution of the application may be started, and a third defined time period, during which the application may be executed, wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null; and a microprocessor coupled to the computer memory and to the tuner, for decoding the interactive application from a received broadcast signal, and programmed to offer to a viewer an option to execute the interactive application during the first defined time period, to execute the interactive application in response to a control signal from the viewer during the second defined time period, and to terminate the application after the expiration of the third defined time period.

18. A computer program product for controlling an interactive application, the computer program product comprising:

program code defining an interactive application which is to be executed by a broadcast receiver concurrently with the receipt and display of an associated television broadcast program;

program code defining a first defined time period, during which an option to execute the application may be offered to a viewer, a second defined time period, during which execution of the application may be started, and a third defined time period, during which the application may be executed, wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null; and a computer readable medium on which the program codes are stored.

19. The computer program product of claim 18 further comprising:

program code defining a reference time base to which at least one received defined time period is relative.

20. A computer program product for controlling execution of interactive applications by a broadcast receiver, the computer program product comprising:

program code for receiving by the broadcast receiver a broadcast program, an interactive application associated with the broadcast program, a first defined time period, during which an option to execute the application may be offered to a viewer, a second defined time period, during which execution of the application may be started, and a third defined time period, during which the application may be executed, wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null;

program code for controlling execution timing of the interactive application by the broadcast receiver according to the defined time periods; and a computer readable medium on which the program codes are stored.

21. The computer program product of claim 20, the computer program product further comprising:

program code for offering to the viewer, by the broadcast receiver, the option to execute the interactive application during at least some of the first time period, during which the option to execute the application may be offered.

22. The computer program product of claim 20, the computer program product further comprising:

program code for waiting until the first time period, during which the option to execute the interactive application may be offered has at least started prior to offering the option to execute the interactive application to the viewer.

23. The computer program product of claim 21, the computer program product further comprising:

program code for determining that a present time is within the first time period, during which an option to execute the interactive application may be offered to a viewer; and program code for offering to the viewer the option to execute the interactive application.

24. The computer program product of claim 20, the computer program product further comprising:

program code for starting execution of the interactive application by the broadcast receiver in response to a control signal from the viewer during the second time period, during which the execution of the interactive application may be started.

25. The computer program product of claim 20, the computer program product further comprising:

program code for waiting until the second time period, during which execution of the interactive application may be started, has at least begun prior to executing the interactive application.

26. The computer program product of claim 20 further comprising:

program code for determining that a present time is within the second time period, during which execution of the interactive application may be started; and program code for starting execution of the interactive application by the broadcast receiver in response to a control signal from the viewer.

27. The computer program product of claim 20, the computer program product further comprising:

program code for executing the interactive application by the broadcast receiver during at least some of the third time period, during which the interactive application may be executed.

28. The computer program product of claim 20, the computer program product further comprising:

program code for detecting by the broadcast receiver the expiration of the third time period, during which the interactive application may be executed; and program code for retiring the interactive application by the broadcast receiver.

29. The computer program product of claim 20, the computer program product further comprising:

program code for receiving by the broadcast receiver a reference time base to which at least one received defined time period is relative;

program code for maintaining an internal timer by the broadcast receiver relative to the reference time base; and program code for determining by the broadcast receiver occurrences of at least one beginning and at least one ending of at least one received defined time period relative to the internal timer.

30. The computer program product of claim 29, the computer program product further comprising:

program code for receiving by the broadcast receiver, after receipt of an initial reference time base, a new reference time base associated with the interactive application;

program code for maintaining an internal timer by the broadcast receiver relative to the new reference time base; and program code for determining by the broadcast receiver occurrences of at least one beginning and at least one ending of at least one received defined time period relative to the internal timer.

31. The computer program product of claim 20, the computer program product further comprising:

program code for receiving by the broadcast receiver, after receipt of the defined time periods, at least one updated defined time period; and program code for replacing an associated earlier defined time period with the updated defined time period.

32. A computer program product for offering to a viewer, by a broadcast receiver, an option to execute an interactive application associated with a broadcast program, the computer program product comprising:

program code for tuning, by the broadcast receiver, to a channel on which a broadcast program is being transmitted;

program code for receiving by the broadcast receiver, an interactive application associated with the broadcast program, a first defined time period, during which an option to execute the application may be offered to a viewer, a second defined time period, during which execution of the application may be started, and a third defined time period, during which the application may be executed wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null;

program determining by the broadcast receiver whether a present time is within the first defined time period, during which the interactive application may be offered to a viewer;

program code for, in response to the present time being within the first defined time period, offering to the viewer, by the broadcast receiver, an option to execute the interactive application;

program code for, in response to the present time not being within the first defined time period, not offering the viewer an option to execute the interactive application; and a computer readable medium on which the program codes are stored.

33. The computer program product of claim 32 further comprising:

program code for receiving a reference time base by the broadcast receiver;

program code for making the determination by the broadcast receiver of whether a present time is within the first received time period during which the interactive application may be offered to a viewer based upon the reference time base.

34. A computer program product for starting, by a broadcast receiver, execution of interactive applications associated with broadcast programs, the computer program product comprising:

program code for tuning, by the broadcast receiver, to a channel on which a broadcast program is being transmitted;

program code for receiving by the broadcast receiver, an interactive application associated with the broadcast program, a first defined time period, during which an option to execute the application may be offered to a viewer, a second defined time period, during which execution of the application may be started, and a third defined time period, during which the application may be executed, wherein the third defined time period begins and ends during the transmission of the broadcast program, wherein the first defined time period and the second defined time period do not begin prior to the third defined time period, wherein the first defined time period and the second defined time period end prior to the third defined time period, and wherein all three defined time periods are not null;

program code for determining by the broadcast receiver whether a present time is within the second defined time period, during which execution of the interactive application may be started;

program code for, in response to the present time being within the second defined time period, starring the execution of the interactive application by the broadcast receiver;

program code for, in response to the present time not being within the second defined time period, not starting the execution of the interactive application by the broadcast receiver; and a computer readable medium on which the program codes are stored.

35. The computer program product of claim 34 further comprising:

program code for receiving a reference time base by the broadcast receiver; and program code for making the determination by the broadcast receiver of whether a present time is within the second received time period during which execution of the application may be started based upon the reference time base.

* * * * *

UNITED STATES PATENT AND TRADEMARK OFFICE
CERTIFICATE OF CORRECTION

PATENT NO.     : 6,530,084 B1                                              Page 1 of 1
DATED          : March 4, 2003
INVENTOR(S)    : Eric E. Del Sesto et al.

It is certified that error appears in the above-identified patent and that said Letters Patent is hereby corrected as shown below:

Column 13,
Line 43, delete "broadcast program a first" and replace with -- broadcast program, a first --.

Column 14,
Line 11, delete "tuning by the broadcast" and replace with -- tuning, by the broadcast --.

Column 16,
Line 6, delete "of claim 21, the" and replace with -- of claim 20, the --.

Column 18,
Line 36, delete "defined time period, starring the" and replace with -- defined time period, starting the --.

Signed and Sealed this

Fifth Day of August, 2003

JAMES E. ROGAN
*Director of the United States Patent and Trademark Office*